FIG. 4
| SOLENOIDS | | | | POSITION |
|---|---|---|---|---|
| 1 | 2 | 3 | 4 | |
| ON | | ON | | REVERSE |
| | | ON | ON | NEUTRAL |
| ON | | | ON | DRIVE |
| | ON | | ON | 1 |
| ON | ON | | ON | 2 |
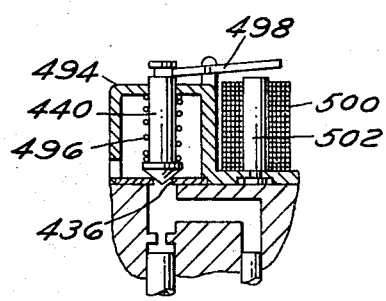
FIG. 5
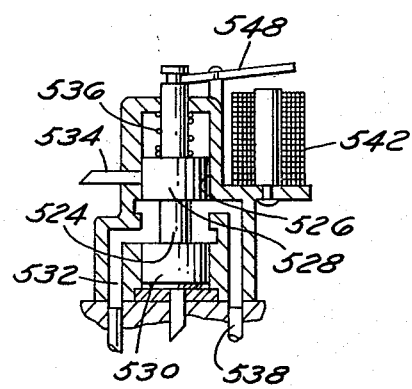
FIG. 6
INVENTOR
GEORGE E. LEMIEUX
BY John R. Faulkner
Donald J. Harrington
ATTORNEYS

United States Patent Office 3,505,906
Patented Apr. 14, 1970

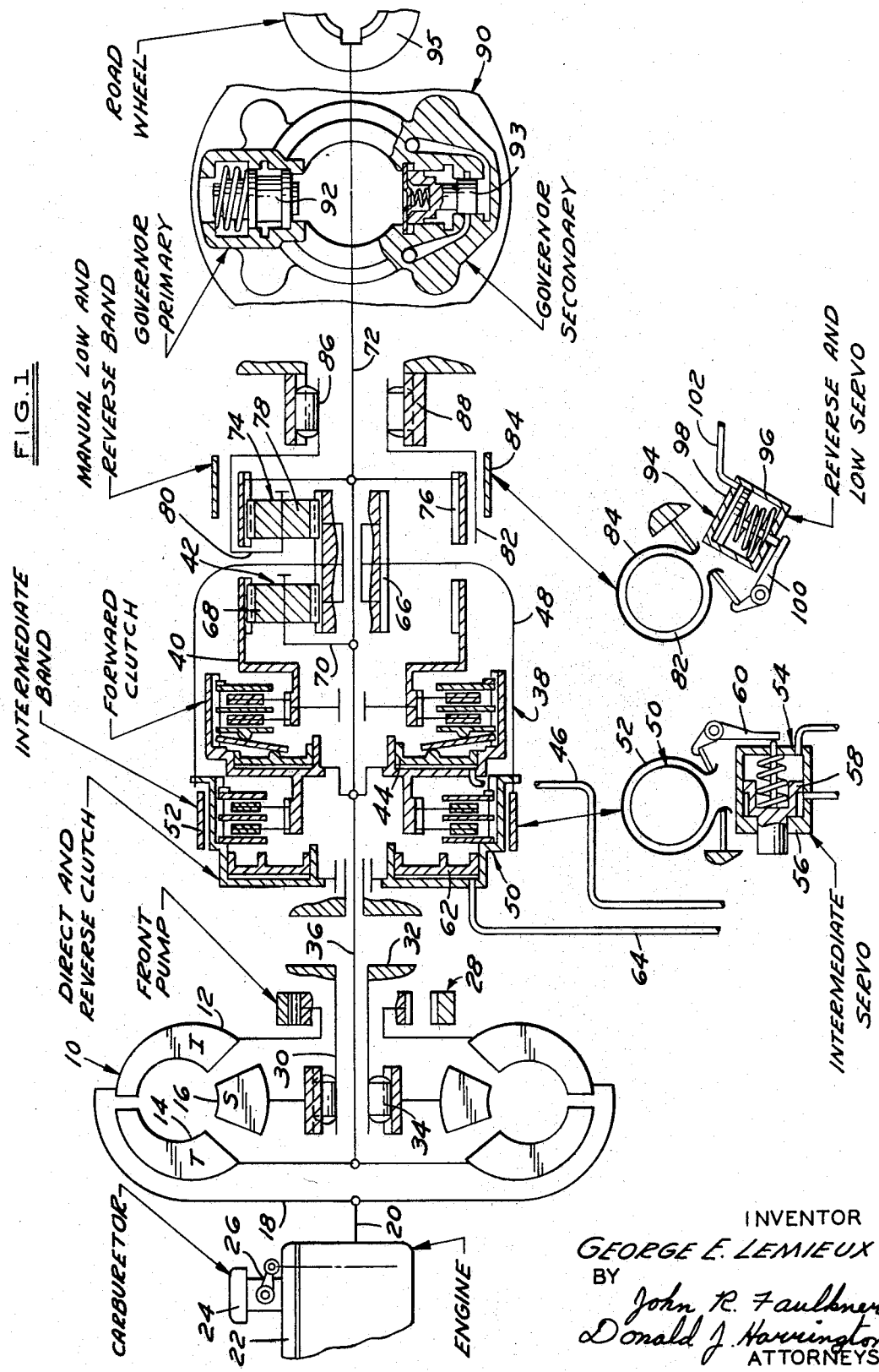

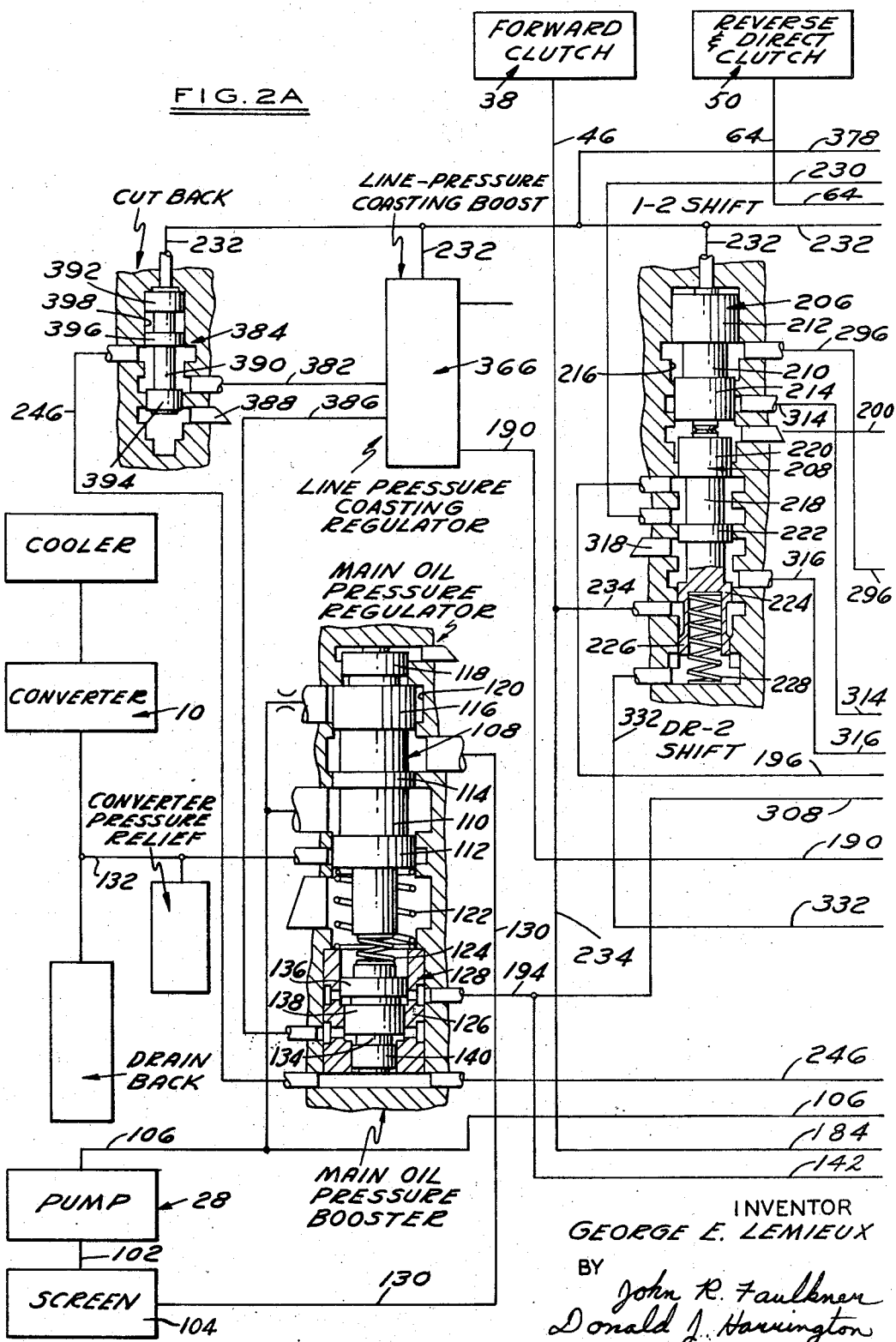

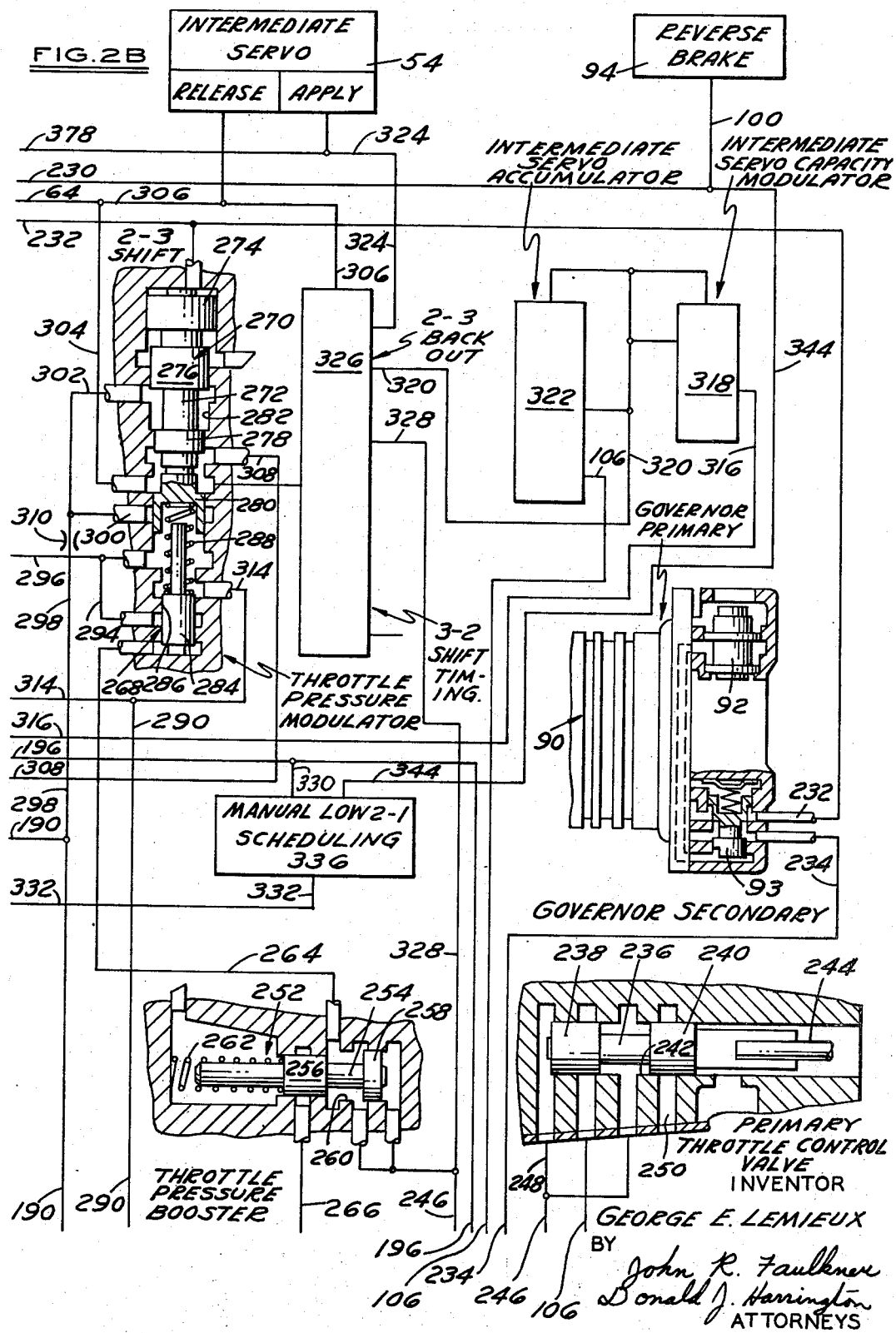

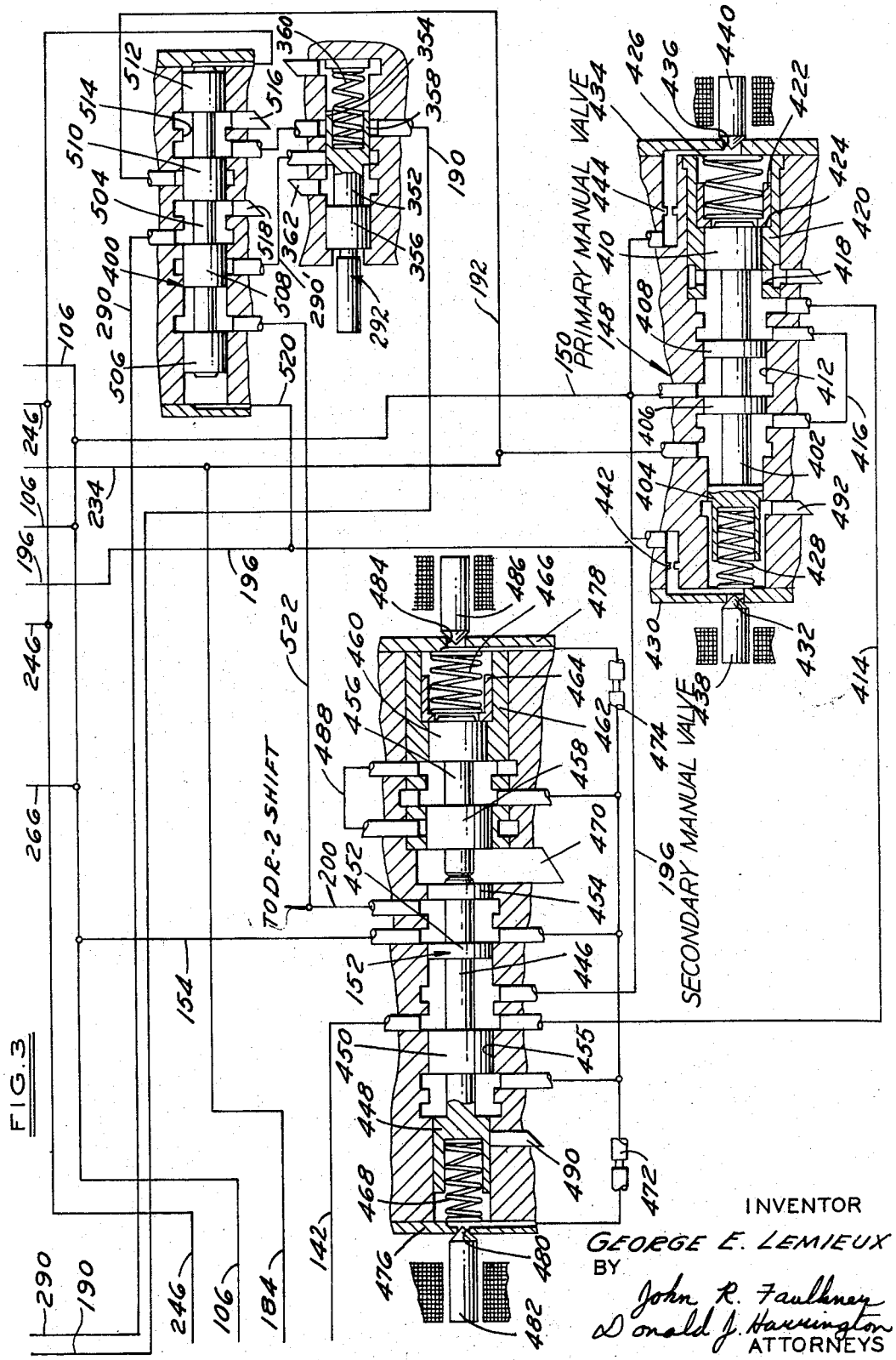

3,505,906
REMOTE CONTROL TRANSMISSION RANGE SELECTOR VALVE FOR AN AUTOMOTIVE VEHICLE POWER TRANSMISSION MECHANISM

George E. Lemieux, Livonia, Mich., assignor to Ford Motor Company, Dearborn, Mich., a corporation of Delaware
Filed Feb. 20, 1968, Ser. No. 706,933
Int. Cl. B60k 21/06; F16h 5/60
U.S. Cl. 74—753                                    6 Claims

ABSTRACT OF THE DISCLOSURE

This specification discloses an electric solenoid operated manual selector valve for the control system of an automatic vehicle power transmission mechanism. Multiple forward drive ranges are established by appropriately positioning movable valve elements to each of several fixed positions, which will permit distinctive valve functions, including three forward driving operating modes and a single reverse drive operating mode. Each of the movable elements of the manual valve system is controlled by pilot valves, which in turn are actuated remotely by means of driver-controlled solenoid operators. The manual valves acting in cooperation with each other and with a downshift blocker valve distribute selectively control pressure to various regions of the circuit thereby initiating the desired circuit functions.

GENERAL DESCRIPTION OF THE INVENTION

The improvements of this invention can be adapted readily to a control system such as that shown in U.S. application Ser. No. 518,820 filed by Stanley L. Pierce, Jr., now Patent No. 3,393,585, which is assigned to the assignee of my instant invention. The copending disclosure describes an automatic power transmission mechanism having planetary gearing capable of establishing multiple torque delivery paths between an internal combustion vehicle engine and the vehicle traction wheels. The transmission includes clutches and brakes which control the relative motion of the gear elements as various speed ratios and drive ranges are established.

A source of control pressure, which may be an engine-driven, positive displacement pump, distributes control pressure to the clutches and brakes to actuate them. This pressure distribution is controlled by pressure distributor valves that respond automatically to an engine torque signal and a vehicle speed signal to initiate transmission ratio changes in any one of several clutch or brake engagement and release patterns.

The improvement of my invention comprises a manual selector valve system situated between the pressure source and the pressure distributor valve elements whereby the operator may control the operating mode of the pressure signal responsive valve elements.

In a preferred embodiment of my invention, the manual selector valve system comprises a primary manual valve and a secondary manual valve, each of which includes a multiple land valve spool shiftable between each of two operating positions. The movable element of each of the manual valves is controlled by solenoid operated pilot valves, one pilot valve being connected hydraulically to one side of each of the manual valve elements.

Each manual valve element has a pressure chamber on one side thereof which is in communication with the main pressure source across an orifice. The pressure chamber communicates with a low pressure exhaust region through the pilot valve so that when the pilot valve is actuated, its associated pressure chamber is exhausted, thereby initiating a shifting movement of the adjacent manual valve element. Thus the positions of the manual valve elements can be controlled by actuating selectively the various pilot valve operators. This may be done at a remote control station by means of a suitable electrical switching circuit that is under the control of the vehicle operator.

The provision of a transmission control system having the above characteristics being an object of my invention, it is another object of my invention to provide a control valve system for an automatic power transmission system in an automotive vehicle driveline, said valve system including manual selector valves which may be actuated by the vehicle operator without the use of a direct mechanical connection between the driver-operated control element and the manual valves, thereby permitting the location of the operator's console at the most convenient location within the vehicle passenger compartment.

BRIEF DESCRIPTION OF THE FIGURES OF THE DRAWINGS

FIGURE 1 shows in schematic form an assembly view of an automatic power transmission mechanism capable of being controlled by the improved valve system of my invention;

FIGURES 2a, 2b and 3 show in schematic form a control valve system for the transmission structure of FIGURE 1; FIGURE 3 shows the portion of the control system that includes the primary manual valve and secondary manual valve of my invention;

FIGURE 4 is a chart showing the solenoid valve operating pattern for the various drive ranges;

FIGURE 5 is a schematic, cross-sectional view of one form of a solenoid-operated pilot valve used in the FIGURE 3 construction; and FIGURE 6 is an alternate embodiment of the solenoid-operated pilot valve, which performs the same function as the valve of FIGURE 5.

PARTICULAR DESCRIPTION OF THE INVENTION

In FIGURE 1, numeral 10 designates a hydrokinetic torque converter unit comprising an impeller 12, a turbine 14 and a stator 16. The converter members are bladed and they are situated in toroidal, fluid flow relationship in a common torus circuit. Stator 16 changes the tangential component of the absolute fluid flow velocity vector of the fluid that leaves the turbine thereby creating a hydrokinetic torque reaction. This torque reaction is distributed to a portion of the housing 32 through an overrunning coupling 34 and a stationary stator sleeve shaft 30. Coupling 34 prevents rotation of the stator in a direction opposite to the direction of rotation of the turbine and the impeller, but freewheeling motion in the other direction is permitted when the converter acts as a fluid coupling.

The impeller 12 is connected by means of a drive plate 18 to the crankshaft 20 for an internal combustion vehicle engine 22. The engine includes an air-fuel mixture intake manifold that is supplied with a combustible mixture by a carburetor 24. An engine carburetor throttle valve, shown in part at 26, controls the flow of combustible mixture to the engine intake manifold.

A positive displacement fluid pump 28 is drivably connected to the impeller 18 and is effective to supply fluid pressure whenever the engine is operating. Pump 28 acts as a pressure source for the control system that will be described with reference to FIGURES 2a, 2b and 3.

The turbine 14 is connected to a turbine shaft 36, which in turn may be connected to a ring gear 40 for a first simple planetary gear unit 42. A selectively engageable forward clutch 38 is provided for the purpose of establishing and interrupting the connection between shaft 36 and ring gear 40. Forward clutch 38 includes an internally splined clutch drum that defines an annular cylinder within which an annular piston 44 is situated. This annular piston and the annular cylinder cooperate to define a pressure cavity that is supplied with actuating fluid pressure by means of a feed passage 46. A drive shell 48 is connected to a clutch drum for direct and reverse clutch 50.

A brake band 52 surrounding the drum may be applied and released selectively by means of an intermediate servo shown in FIGURE 1 at 54. The servo includes a cylinder 56 which receives a piston 58. The cylinder and the piston cooperate to define a pair of opposed fluid pressure chambers that may be supplied with actuating fluid by means of separate pressure feed passages as will be seen in the subsequent description. The pressure force acting upon piston 58 is transferred to the operating end of brake band 52 by means of a motion transmitting brake lever 60. The other end of the brake band 52 is anchored in a conventional fashion.

The drum for the direct and reverse clutch 50 defines an annular cylinder within which is received an annular piston 62. This piston and its cooperating cylinder define a working chamber that is supplied with fluid by means of a pressure feed passage 64.

A simple planetary gear unit 42 includes also a sun gear 66 which meshes with a set of planet pinions 68. These pinions are rotatably carried by a carrier 70, which is connected directly to a power output shaft 72.

Sun gear 66 forms also a part of a second simple planetary gear unit 74. This gear unit includes also a ring gear 76 and a set of planet pinions 78, the latter being journalled rotatably on a carrier 80. Carrier 80 defines a brake drum 82 which in turn carried brake discs of a manual low-and-reverse brake 84. The driving torque reaction on the carrier is accommodated by means of an overrunning coupling having brake rollers 86. These rollers are disposed between an inner race, that is common to the carrier 80, and an outer race 88, the latter being cammed to provide cam surfaces that cooperate with the rollers 86 to inhibit rotation of the carrier 80 in one direction, although freewheeling motion of the carrier 80 in the opposite direction is permitted. Race 88 is secured fast to the transmission housing.

A fluid pressure governor valve assembly 90 is drivably carried by power output shaft 72. It includes a primary governor valve 92 and a secondary governor valve 93, each valve being sitauated on opposed sides of the axis of rotation of the shaft 72. As will be explained subsequently, the primary governor valve inhibits the modulating action of the secondary governor valve at speeds of rotation of the shaft 72 that are less than a predetermined value. At any speed greater than that predetermined value, the secondary governor valve is effective to establish a pressure signal that is proportional in magnitude to the speed of rotation of the shaft 72. The signal may be utilized by the automatic control valve system that will be described subsequently.

Shaft 72 can be connected to the vehicle road wheels 95 through a driveshaft and differential and axle assembly.

The discs of brake 84 are applied and released by means of a fluid pressure operated servo 94. The servo includes a cylinder 96 within which is positioned a fluid pressure operated piston 98. Cylinder 96 and piston 98 define a pressure chamber that can be supplied with control pressure through a feed passage 100. The fluid pressure force acting upon the piston 98 is transferred to the operating end of the brake band 84 by means of a disc brake pressure ring shown at 100. The cylinder 96 is defined by the relatively stationary transmission housing.

The transmission mechanism may be conditioned for continuous operation in the lowest speed ratio by appropriately adjusting a manual value to the low speed ratio position as will be explained subsequently. This causes fluid pressure to be distributed to the pressure chamber for the reverse-and-low servo. The forward clutch 38 is applied during operation in the forward drive range in any speed ratio. If both the brake 84 and the clutch 38 are applied, the turbine torque delivered to the turbine shaft 36 is distributed through the engaged forward clutch 38 to ring gear 40.

The driven shaft 72 to which the carriers 70 and 80 are connected tends to resist rotation. Thus, there is a tendency for sun gear 66 to rotate in a direction opposite to the direction of rotation of shaft 36. This, then, tends to cause carrier 80 to rotate in the same direction as the direction of rotation of sun gear 66. It is inhibited from doing so, however, both by the overrunning brake shown in part at 86 and also by the engaged brake 84. The torque acting on the ring gear 76 then is in a forward driving direction. It supplements the driving torque of the carrier 70 so that a split torque delivery path is provided between the shaft 36 and the shaft 72.

Drive shell 48 which is connected directly to the sun gear 66 can be braked by applying the intermediate servo, thus establishing intermediate speed ratio operation. Under these conditions, the brake 84 is released while the clutch 38 remains applied. Clutch 50, of course, is released. The sun gear 66 functions as a reaction member during such intermediate speed ratio operation, and the driving torque delivered to the ring gear 40 is multiplied by the first planetary gear unit 42. The overall speed ratio then is greater than the lowest speed ratio, but it is less than unity. The overrunning coupling shown in part at 86 freewheels during this speed ratio change from the lowest speed ratio to the intermediate speed ratio.

To condition the mechanism for operation in the lowest speed ratio during normal acceleration from a standing start, it is not necessary to apply brake 84. The overrunning brake shown in part at 86 accommodates the forward acting torque. Upon application of the intermediate speed ratio brake band 52, an automatic pickup shift from the lowest speed ratio to the highest speed ratio is obtained. This is accomplished by the engagement of a single friction torque establishing device without the necessity for engaging or releasing a second friction torque establishing device in the system.

A speed ratio change from the intermediate speed ratio to the direct drive, high speed ratio is accomplished by releasing brake band 52 and applying both clutches 38 and 50 simultaneously. Brake band 52 is released by distributing pressure to the right-hand side of the piston 58. The brake band 52 is released when both pressure chambers of the intermediate servo are pressurized.

It will be seen, therefore, that the elements of the gear units will be caused to rotate in unison when both clutches are applied. A direct drive connection between shafts 36 and 72 then is provided.

Automatic speed ratio changes can be accomplished in order to condition the driveline for various road conditions and for various operating demands. This is done by means of the control valve system that now will be described.

In FIGURE 2a, the engine driven front pump 28 receives its supply of oil through a supply passage 102, which communicates with the transmission sump that may be defined by the lower region of the transmission housing. An oil screen 104 is located in the sump at the intake end of the passage 102.

The high pressure side of the pump 28 communicates with the main line pressure passage 106. A main regulator valve 108 maintains a controlled pressure level in the passage 106. It includes a movable valve element 110 having spaced valve lands 112, 114, 116 and 118. These lands are adapted to register with internal valve lands formed in a valve bore 20 which receives the valve element 110. The portion of the chamber 120 at the upper end of the land 118 is exhausted. Line pressure from passage 106 is distributed to the differential area defined by lands 118 and 116, thereby creating a pressure force that is opposed by the force of valve springs 122 and 124. Spring 122 is seated on the valve sleeve insert 126, which forms a part of a pressure booster valve 128. The region of the chamber 120 that is occupied by the springs 122 and 124 is exhausted as indicated.

When pressure in passage 106 begins to be developed as the pump 28 becomes operative, valve element 110 is urged in a downward direction to provide controlled communication between passage 106 and a low pressure oil return passage 130. Before land 114 uncovers the passage 130, however, land 112 uncovers converter fluid supply passage 132. Thus, the converter is filled during the initial stages of the pressure build-up in the control system. Once the land 114 establishes communication between passage 106 and passage 130, however, the element 110 begins to regulate the pressure in passage 106.

The pressure booster valve comprises a valve element 134 which has spaced valve lands 136, 138 and 140 formed with a progressively decreasing diameters. The differential area defined by lands 136 and 138 communicates with a passage 194 which is pressurized, as will be explained subsequently, whenever the transmission mechanism is conditioned for reverse drive operation. The resulting pressure force acting on the element 134 thus augments the force of the valve springs for the main regulator valve to cause the main regulator valve to maintain a higher pressure level in the circuit than the corresponding pressure level that would exist during forward drive operation. The servos which must accommodate the increased driving torque under reverse driving conditions thus can be maintained at the proper pressure level to avoid slippage of the clutch and brake friction elements.

The lower area of land 140 is in communication with passage 246, which is subjected to an engine torque sensitive signal pressure during normal operation. The resulting pressure force acting upon the pressure booster valve supplements the spring force after the magnitude of the signal pressure reaches a predetermined value. After that value is reached, the regulated line pressure maintained by the main regulator valve will be dependent upon engine torque. For any magnitude of the signal pressure less than that predetermined value, the pressure force acting upon the pressure booster valve will be insufficient to overcome the force of spring 124. The spring 124 yields, however, when the magnitude of the signal pressure in passage 246 exceeds the predetermined value.

A cut-back pressure passage 386 communicates with the differential area of lands 138 and 140. Passage 386 communicates through a coasting boost valve with a so-called cut-back valve, which will be described subsequently, and it in turn communicates with the engine torque signal pressure source. The cut-back valve is road-speed sensitive. At any road-speed less than a predetermined value, the cut-back valve causes passage 386 to become pressurized with the torque sensitive signal pressure.

Thus during acceleration from a standing start when the hydrokinetic torque ratio of the converter is at a maximum value, the available line pressure for any given engine throttle setting will be at a maximum value.

The regulated line pressure in passage 106 is distributed to a primary manual valve 148 through branch passage 150 and to a secondary manual valve 152 through branch passage 154.

Passage 196 is pressurized only during reverse drive operation and during operation in the low speed ratio, forward drive range. Passage 194 becomes pressurized only during reverse drive operation. Passage 234 becomes pressurized only during automatic drive range operation. Finally, passage 200 becomes pressurized only when valve element 152 assumes the D2 position.

Passage 142 communicates through passage 234 directly with the feed passage 46 for the forward clutch. Thus the forward clutch is applied whenever the manual valve assumes the D position, the D2 position or the L position.

Speed ratio changes between low speed ratio and the intermediate speed ratio are controlled by the 1-2 shift valve 206 and the D2 shift valve 208.

Valve 206 includes a valve spool 210 having a pair of spaced valve lands 212 and 214. Valve element 210 is situated slidably within a valve chamber 216 which has formed therein internal valve lands that register with the external valve lands 212 and 214.

Valve element 210 engages the DR-2 shift valve element 218 which has formed thereon spaced valve lands 220, 222, 224 and 226. A valve spring 228 urges the valve elements 210 and 218 in an upward direction as viewed in FIGURE 2b.

Passage 196, which is pressurized when the manual valve system assumes the L or R condition, communicates with the valve chamber 216 at a location intermediate lands 220 and 222 on the valve element 218. The valve element 218 and the valve element 210 share the same valve chamber 216, the latter being formed with internal valve lands that cooperate with the external valve lands 220, 222, 224 and 226 on the valve element 218.

When the DR-2 shift valve assumes the position shown, communication is established between passage 196 and a passage 230. This passage communicates with feed passage 100 for the low and reverse brake servo. Governor pressure acts upon the upper end of land 212. It is distributed to chamber 216 through a governor pressure passage 232 which communicates with a suitable governor pressure signal source identified generally by reference character 90. This comprises primary and secondary valve elements 92 and 93 which are connected drivably to power output shaft 72. The valve assembly 90 receives regulated control pressure through passage 234 which is connected directly to passage 192. The governor valve assembly 90 modulates the pressure in passage 234 to produce a pressure signal in passage 232 which is related functionally in magnitude to the driven speed of shaft 72.

The control system includes also a source of a pressure signal that is proportional in magnitude to engine torque. This is obtained by means of a primary throttle valve assembly having a valve spool 236 with spaced valve lands 238 and 240. Valve element 236 is slidably situated within the valve chamber 242 having internal valve lands that register with the valve lands 238 and 240. Valve element 236 normally is urged in a left-hand direction, as viewed in FIGURE 2c, by means of an engine intake manifold pressure operated diaphragm assembly that is in communication with the engine manifold. This assembly exerts a force upon the element 236 by means of a valve actuating rod 244. Control pressure from passage 106 communicates with the chamber 242 at a location directly adjacent land 238. A primary throttle valve output pressure passage 246 communicates with the valve chamber 242 intermediate the lands 238 and 240. A feedback pressure passage 248 extends from the passage 246 to the left-hand end of the chamber 242 thereby creating a throttle pressure force on land 238 that opposes the force of the engine manifold diaphragm assembly.

An exhaust port 250 permits the primary throttle valve assembly to modulate the pressure in passage 106 to produce a resultant pressure in passage 248 that is an indicator of the engine manifold pressure. This in turn is an approximate indicator of engine torque.

Passage 246 communicates with the pressure booster valve and distributes primary throttle pressure to the lower end of land 140 thereby causing the main pressure regulator valve to maintain a pressure level in the system that is proportional to manifold pressure. Passage 246 communicates also with a throttle booster valve 252. This valve includes a valve element 254 having valve lands 256 and 258 slidably situated within a valve chamber 260. A valve spring 262 acts upon element 254 to urge it normally in a right-hand direction as viewed in the drawings.

Throttle pressure in passage 246 acts upon the right-hand end of land 258. The diameter of land 258 is slightly larger than the diameter of land 256. Thus, the pressure force acting on the right-hand side of land 258 is opposed by the force of the pressure in passage 264, the latter communicating with valve chamber 260 at a location adjacent land 256. Regulated line pressure from passage 106 is distributed through passage 266 to the valve chamber 260. Valve element 254 modulates the pressure in passage 266 to produce a pressure in passage 264 that is magnified relative to the pressure in passage 246.

When the engine carburetor throttle setting is relatively slight, the magnitude of the pressure in passage 264 is insufficient to cause valve element 254 to modulate. Under these conditions the pressure in passage 264 equals the pressure in passage 246. The pressure in passage 264 is used to establish the shift points as will be explained subsequently.

When the engine carburetor throttle setting increases beyond a so-called midpoint, the ranges of the pressure in passage 246 no longer is proportional to carburetor throttle opening or engine torque demand. This is because the engine manifold pressure varies only very slightly for any given degree of opening of the engine throttle when the midpoint throttle setting is reached. Thus, in order to produce a useful signal it becomes necessary to augment the signal pressure in passage 246. This is the function of the throttle booster valve since it modulates the regulated control pressure in passage 266 in accordance with variations in the signal pressure of passage 246 to produce a magnified pressure signal in passage 264 which can be used as an indicator of engine torque demand. The throttle booster valve is sensitive to the pressure in passage 246 since the latter is directed to the right-hand end of the valve land 258 thus producing a force which opposes the force of spring 262.

Passage 264 communicates with the throttle modulator valve 268 which applies a modulated throttle pressure signal to a 2–3 shift valve 270. Valve 270 includes a multiple land valve spool 272 on which are formed external valve lands 274, 276, 278 and 280. These valve lands register with internal valve lands formed on a valve chamber 282 within which the valve element 272 is situated.

The throttle modulator valve includes a single diameter valve element 284 which is slidably situated within a valve chamber 286, the latter communicating with chamber 282 and forming an extension thereof. A valve spring 288 is positioned between valve element 284 and valve element 272. Booster throttle pressure in passage 264 is distributed to the lower end of chamber 286 thereby exerting on valve element 284 a pressure force that opposes the force of spring 288. A passage 290, which normally is exhausted through the downshift valve shown at 292, communicates with chamber 286 adjacent the upper edge of valve element 284. A branch passage 294 extends from the chamber 286 to the lower end of chamber 282. Valve element 284 controls communication between passage 294 and passage 264. Passage 294 communicates also with passage 296, which extends to the annular area defined by the differential diameter valve lands 214 and 212.

Passage 190 which is pressurized when the manual valve assumes the D position, communicates with a passage 298 which extends to a port 300 and to a port 302 formed in the valve chamber 282. Port 300 registers with valve land 280 and port 302 is located adjacent land 276. A reverse and direct clutch feed passage 304 communicates with valve chamber 282 at a location intermediate lands 278 and 280. Passage 304 communicates with the previously described passage 64. A passage 306, which communicates with the release side of the intermediate servo, communicates with passage 304. Thus, a release of the intermediate speed ratio brake and the application of the direct and reverse clutch occurs simultaneously in response to movement of the 2–3 shift valve 270. When the 2–3 shift valve element 272 assumes the position shown, passage 304 is exhausted through passage 308 which communicates with the valve chamber 282 adjacent land 278. Passage 308 in turn communicates with passage 194 which is pressurized, as mentioned previously, when the manual valve element assumes a reverse drive position. It is exhausted under all other conditions.

A flow restricting orifice 310 is situated in passage 298 to retard the rate of pressurized fluid distribution to the 2–3 shift valve.

The throttle modulator valve element 284 produces a modulated pressure in passage 294 and in passage 296. Thus both the 1–2 shift valve and the 2–3 shift valve are sensitive to changes in the engine manifold pressure. Passage 290, which is exhausted during forward drive operation, communicates also with a passage 314 across the valve chamber 286. When the 1–2 shift valve assembly moves in a downward direction, the annular area defined by the differential diameter valve lands 212 and 214 becomes exhausted through passage 314. Prior to that time, this same annular area is pressurized with modulated throttle pressure thus producing a force that supplements the force of spring 228.

Passage 316 receives clutch applying pressure from intermediate servo capacity modulator valve 318. When the shift valve 218 is in the position shown, communication is established between passage 196 and passage 230 which is turn communicates with the low and reverse servo through passage 100. When the 1–2 shift valve element 210 and the DR–2 shift valve element 218 are in a downward position, land 220 blocks communication between passage 296 and valve chamber 216 while passage 230 becomes exhausted through an exhaust port 319.

The 1–2 shift capacity scheduling valve 318 is described in copending application Ser. No. 426,928, now abandoned, which is assigned to the assignee of my instate invention. It is supplied with fluid pressure through a passage 320 which communicates also with an accumulator valve 322. This valve modifies the rate of application of the intermediate speed ratio brake band during a 1–2 upshift. Valve 322 is described in my copending application.

Passage 320 in turn is supplied with fluid by means of a pressure passage 324 which communicates directly with the apply side of the intermediate servo. Communication between passages 320 and 324 is provided by a 2–3 back-out valve 326, which also is described in my copending application. This back-out valve is subjected to primary throttle pressure which is distributed thereto through a primary throttle valve pressure passage 328. The 2–3 back-out valve includes also a manual-low valve which may be pressurized by means of a passage 330 communicating with the passage 196, the latter being pressurized when the manual valve is shifted to the L or R positions. The manual valve, when it is pressurized, renders the 2–3 back-out valve inoperative thereby maintaining continuous communication between passages 324 and 320. The same result occurs if throttle pressure exists in passage 328. In the absence of pressure on the manual-low valve, and when the passage 328 is subjected to the minimum throttle pressure that exists during coasting, the 2–3 back-out valve will respond to cushion the rate of application of the forward clutch thereby eliminating an undesirable harshness in the speed ratio change from the intermediate speed ratio to the high speed ratio under zero throttle conditions.

Passage 200 which is pressurized whenever the manual valve is shifted to the D2 position, communicates with the valve chamber 216 of the 1–2 shift valve assembly at a location intermediate land 214 and land 220. Thus, when passage 200 becomes pressurized, valve element 210 is moved in an upward direction and valve element 218 is moved in a downward direction. Passage 192, which is pressurized when the manual value is in the D2 position, continues to suppply operating pressure to the forward clutch. Thus the transmission system, upon movement of the manual valve to the D2 position, will assume an intermediate speed ratio condition. It then is conditioned for continuous operation in the intermediate speed ratio. Neither upshifts nor downshifts are possible. Although the 2–3 shift valve assembly may move under the influence of modulated throttle pressure and governer pressure, this has no affect on the existing transmission speed ratio since passage 190 is exhausted. That passage normally feeds the 2–3 shift valve assembly.

Lands 224 and 226 on the DR–2 shift valve are formed with a slight differential area that is in fluid communication through branch passage 334 with pressurized passage 192. This produces a slight downshifting force on the 1–2 shift valve assembly. The shift point pressure in passage 332 is supplied by a manual-low 2–1 scheduling valve 336.

The valve 336 may be calibrated so that the desired 2–1 shift point during coasting can be established after the manual valve is moved to the L position. When the governor pressure falls to a value that will permit the DR–2 shift valve and the 1–2 shift valve to shift in an upward direction, passage 196 becomes connected to passage 230 as the connection between passage 230 and the exhaust port 318 is interrupted. This causes passage 344 to become pressurized with the same pressure to which the low and reverse servo 94 is subjected. This then causes the scheduling valve 336 to shift as direct communication is established between passage 334 and passage 332. This then causes full line pressure to be exerted on the DR–2 shift valve thereby locking the DR–2 shift valve and the 1–2 shift valve in an upward position. Speed ratio changes, thereafter, are inhibited.

When the manual system is conditioned for operation in the automatic drive range, passage 190 becomes pressurized as well as passage 192. Passages 200, 150, 194 and 196 become exhausted. Passage 190 distributes regulated control pressure to passage 298, which supplies the 2–3 shift valve as explained previously. Thus automatic ratio changes between the intermediate speed ratio and the high speed ratio can be accomplished as the vehicle speed changes for any given engine manifold pressure.

Passage 192 distributes control pressure to the forward clutch. Under these conditions, the overrunning brake shown in part at 86 provides the necessary torque reaction during low speed ratio operation. It is only necessary during low speed ratio operation to apply the forward clutch.

As the vehicle accelerates during operation in the automatic drive range, the 1–2 shift valve and the DR–2 shift valve will shift in a downward direction thereby connecting passage 234 with passage 316. The intermediate servo capacitor modulator valve provides a fluid connection between passage 316 and passage 320. The 2–3 backout valve 326 provides a fluid connection between passage 320 and passage 324. Thus, when the DR–2 shift valve is shifted in a downward direction, the apply side of the intermediate servo becomes pressurized. Since the forward clutch and the intermediate servo then are applied simultaneously, the transmission system assumes an intermediate speed ratio condition.

Upon a further increase in the vehicle speed for any given engine throttle setting, the 2–3 shift valve will respond to connect passage 304 with pressurized passage 298. This will cause the reverse and direct clutch to become applied as the release side of the intermediate servo becomes pressurized.

The shift valves can be forced to their downshift positions by the influence of the downshift valve 292. This valve includes a valve spool 352 which is slidably positioned in a valve chamber 354. Spool 352 is formed with spaced valve lands 356 and 358 which register with internal valve lands formed in the valve chamber 354. A valve spring 360 urges the valve element 352 in a left-hand direction. When it is in the position shown, passage 290', which communicates with the chamber 354, is exhausted through an exhaust port 362. At this time, passage 190, which communicates directly with chamber 354, is covered by land 358.

The vehicle operator may shift the valve element 352 in a right-hand direction by means of a suitable mechanical linkage that is connected to the engine carburetor throttle. The valve is actuated when the carburetor throttle is advanced to a wide open setting. When the engine carburetor throttle setting is less than the wide open setting, the linkage does not alter the position of the valve element 352.

To effect the full throttle downshift, the operator shifts the valve element 352 in a right-hand direction thereby blocking exhaust port 362 and establishing a connection between passages 364 and 290'. This causes control pressure to pass through passages 290' and 290 when the downshift blocker valve 400 is moved to the left. Passage 290 then distributes pressure to the lower valve land of the 2–3 shift valve and the area defined by differential diameter valve lands 212 and 214 of the 1–2 shift valve. The 2–3 shift valve immediately will assume a downshift position. If the vehicle speed is less than a predetermined value, the 1–2 shift valve also will assume a downshift position. If the vehicle speed is greater than that predetermined value, however, the 1–2 shift valve will not be moved and the transmission system will assume an intermediate speed ratio condition until the vehicle speed is reduced to a sufficiently low value to permit a 2–1 downshift.

When a downshift from the intermediate speed ratio to the low speed ratio occurs after moving the manual valve to the L position, the shift point is independent of carburetor throttle setting and engine intake manifold pressure. In this respect, the 2–1 downshift point differs from the corresponding 2–1 downshift point that is obtained by using the downshift valve 292.

During coasting operation, the line pressure assumes a higher value than during forward drive operation with a zero throttle setting. This boost in line pressure is obtained by means of a coasting boost valve 366, which responds to intermediate servo pressure in passage 378 as described in Patent No. 3,393,585.

Throttle pressure from passage 246 is distributed to valve 366 through a throttle pressure passage 382. A cutback control valve 384 provides a connection between passage 382 and passage 246. Passage 382 intersects chamber 376 at a location adjacent land 370.

A coasting boost valve output pressure passage 386 intersects the chamber 376 at a location intermediate lands 370 and 372. Passage 386 communicates directly with passage 146.

Control pressure will be fed to the coasting boost valve whenever the intermediate servo is applied. Thus it is possible to achieve a line pressure boost whenever the vehicle is coasting in the intermediate speed ratio. It is at this time that an increase in the capacities of the intermediate speed servo and the forward clutch is required. If the vehicle is coasting in the intermediate speed ratio at a relatively low speed, however, the coasting boost valve is ineffective to provide a line pressure boost.

When the manual valve system is conditioned for automatic drive range, passage 190 is pressurized. This interrupts the normal regulating action of the coasting boost valve.

The coasting boost valve is capable of regulating the pressure in passage 378 to produce a resultant pressure in passage 386 that is related in magnitude to vehicle speed. This pressure in passage 386 acts upon the area defined by differential diameter valve lands 138 and 140 of the pressure booster valve element 134. When the valve 366 is not regulating, throttle pressure passes directly from passage 382 to pasage 386. This produces a throttle pressure force that supplements the throttle pressure force acting on the lower end of land 140. Throttle pressure in passage 382 is obtained from the cutback valve 384 when it assumes the position shown. At other times, however, the cutback valve is effective to exhaust passage 382 through exhaust port 388. Thus passage 382 functions as an exhaust passage which will permit valve 366 to regulate the pressure in passage 378.

The cutback valve includes a valve spool 390 which has formed thereon a pair of valve lands 392 and 394. Located between these lands is a third land of lesser diameter, as shown at 396. Valve element 390 is slidably situated within the valve chamber 398. A passage 246 communicates with chamber 390 adjacent land 396. Throttle pressure is distributed through passage 246 to the area defined by differential diameter lands 396 and 392. The resulting force opposes the force of the governor pressure acting on the upper end of land 392. Governor pressure is supplied to the chamber 398 through passage 232.

During initial acceleration from a standing start, the hydrokinetic torque converter functions to multiply engine torque. Thus the torque that must be accommodated by the clutch and brake servos is relatively high. It is at this time that the cutback control valve is effective to distribute primary throttle pressure to passage 146 thereby augmenting the throttle pressure force acting on land 140. As the vehicle accelerates, the governor pressure shifts valve element 390 in a downward direction thereby exhausting passage 382. This occurs at a time prior to or simultaneously with a 1–2 upshift.

It is apparent from the foregoing description that the transmission system is capable of being conditioned for operation in any one of three driving ranges. In the automotive driving range, the transmission system operates automatically to produce ratio changes that depend upon the operating requirements. The automatic ratio shifting tendencies can be overruled, however, when the manual valve system is conditioned for D2 operation. The same is true if it is conditioned for L operation. The transmission system in these instances becomes locked in either the intermediate ratio or the low speed ratio and neither upshifts nor downshifts can be obtained. The only exception to this occurs during L operation when the vehicle is traveling at a speed greater than a safe value. In this instance, the transmission system will initially assume an intermediate speed ratio condition until the vehicle falls below that predetermined safe value. Thereafter the transmission system will be conditioned for continuous operation in the low speed ratio.

Pressure distribution to the various circuit regions can be controlled by the vehicle operator by means of the secondary manual valve 152 and the primary manual valve 148. Valve 148 comprises a multiple land valve element 402 having spaced valve lands 404, 406, 408 and 410. Valve element 402 is slidably situated in the valve chamber 412 which has internal valve lands that register with the lands 404, 406, 408 and 410. Passage 150, which is pressurized by the positive displacement pump 28 communicates with the chamber 412 intermediate the lands 406 and 408. Passage 190 communicates with the chamber 412 at a location intermediate lands 406 and 404. Reverse line pressure passage 414 communicates with the chamber 142 intermediate the lands 408 and 410. The diameter of land 408 is larger than the diameter of land 410.

The annular space between lands 408 and 410 is in fluid communication with the annular space between lands 406 and 404 through cross-over passage 416. Exhaust port 418 communicates with the annular space between lands 408 and 410.

A valve sleeve 420 surrounds land 410. A spring seat 422 in the sleeve 420 engages a shoulder 424 as it is urged in a left-hand direction, as viewed in FIGURE 3, by valve spring 426. Spring seat 422 resists shifting movement of the valve element 402 in a right-hand direction from the position shown in FIGURE 3. Valve spring 428 urges the valve element 402 in a right-hand direction.

The left-hand end of the valve chamber is closed by a cover plate 430 in which is formed an orifice 432. The right-hand end of the valve chamber 412 is closed by an orifice plate 434 in which is formed an orifice 436. The valve element 438 registers with the orifice 432 and a corresponding valve element 440 registers with the orifice 436.

The right-hand side of the orifice plate 430 communicates with the passage 150 through a flow restricting orifice 442. Thus the pressure on the down stream side of the orifice 442 acts on the left-hand side of the valve element 402. A corresponding connection between passage 150 and the left-hand side of the orifice plate 434 is established by flow restricting orifice 444. The pressure on the down stream side of the orifice 444 acts on the right-hand side of the valve element 402. The forces acting on the valve element 402 are balanced when the valve element assumes the position shown in FIGURE 3. This is the position intermediate each of two end positions of the valve element 402.

The secondary manual valve 152 comprises a valve element 446 having spaced valve lands 448, 450, 452 and 454. These lands register with internal valve lands formed in valve chamber 455. The diameter of land 448 is smaller than the diameter of land 450. In a similar fashion the diameter of land 404 is smaller than the diameter of land 406 for the primary manual valve element 402.

The secondary manual valve includes also a second valve element 456 which has formed thereon valve land 458 and valve land 460, the latter being smaller in diameter than the former. Valve element 456 is adapted to contact valve element 446. Valve sleeve 462 surrounds land 460. Spring seat 464 engages a shoulder in the sleeve 462 and the end of the valve element 456. Seat 464 is urged in a left-hand direction by valve spring 466. Another valve spring 468 acts on the left-hand side of the valve element 446. Passage 154 and passage 200 communicate with the valve chamber 455 at a location intermediate lands 452 and 454. The area on the right-hand side of land 454 and the area on the left-hand side of the land 458 communicate with an exhaust port 470. Passage 194 communicates through passage 142 with the valve chamber 455 at a location intermediate lands 450 and 452. When the valve element 446 is positioned as shown, passage 194 communicates with the previously described passage 414.

Passage 196, which is pressurized as explained previously when the manual valve system is conditioned for low and reverse drive operation, communicates with the chamber 455 at a location intermediate lands 450 and 452. Control pressure passage 154 communicates with the left-hand side of the land 448 through flow restricting orifice 472. It communicates with the right-hand side of the land 460 through flow restricting orifice 474. The left-hand end of the valve chamber 456 is closed by orifice plate 476 and the right-hand side of the opening that encloses sleeve 462 is closed by the orifice plate 478. A control orifice 480 is formed in orifice plate 476. A valve element 482 is adapted to register with the orifice 480. A control orifice 484 is formed in orifice plate 478. A valve element 486 registers with the orifice 484.

The space between lands 460 and 458 communicates with the internal valve land surrounding land 458 through crossover passage 488. An exhaust port 490 is situated directly adjacent land 448 and a corresponding exhaust port 492 is situated directly adjacent land 404 of the primary manual valve.

The valve elements 440, 438, 486 and 482 can be controlled by a solenoid operator such as that shown in FIGURE 5. For purpose of illustration I have shown in FIGURE 5 the operator for valve element 440, but it will be understood that the operators for the other orifice valve elements for the primary manual valve and the secondary manual valve will be similar to that shown in FIGURE 5.

In FIGURE 5 valve element 440 is slidably situated in an opening formed in a solenoid housing 494. The nose of the element 440 registers with the orifice 436 and is held in registry with the orifice 436 by valve spring 496. Thus the orifice 436 normally is closed.

The upper end of the valve element 440 is connected to one end of a lever 498 which serves as an armature for solenoid windings 500. The core for the windings 500 is shown at 502. When the windings 500 are energized by an electrical voltage signal, the armature lever 498 moves in a clockwise direction from that shown in FIGURE 5 against the core 502. This raises the valve element 440 so that control orifice 436 becomes opened. This exhausts the spring chamber for the spring 426. The presence of the orifice 444 avoids loss of pressure in the passage 150 when the valve element 440 opens the orifice 436. Valve element 402 then will shift in a right-hand direction because of the force unbalance resulting from the loss of hydraulic pressure from the right-hand side of the land 410. As this shift is made, passage 150 communicates with the space between lands 404 and 406. This creates a force unbalance that tends to maintain the valve element 402 in the right-hand position. Thus the valve element 440 can be returned to the original position as the solenoid windings 500 are de-energized.

If the valve element 438 is moved away from the control orifice 432, the pressure on the downstream side of the orifice 442 and on the left-hand side of the land 404 will become exhausted. This creates a force unbalance that tends to shift the valve element 402 in a left-hand direction. When the valve element 402 assumes the left-hand position, the exhaust port 418 is closed and communication is established between passage 150 and the space between lands 408 and 410 through the cross-over passage 416. This creates a holding force that maintains the valve element 402 in the left-hand position. The solenoid operator for valve element 438 then can be de-energized. Thus three operating positions for the primary manual valve are established, namely, the left-hand position, the right-hand position and an intermediate position, the latter being shown in FIGURE 3.

In a similar fashion the secondary manual valve can be shifted between a left-hand position and a right-hand position. It may assume also an intermediate position which is the one shown in FIGURE 3. To shift the valve elements 456 and 446 in a left-hand direction, a solenoid operator for valve element 482 is energized thereby opening control orifice 480. This exhausts the pressure from the left-hand side of the land 448. This pressure is maintained on the right-hand side of the land 460. The valve elements then will shift in a left-hand direction and as this is done, the space between lands 458 and 460 continue to communicate with the high pressure passage 154. At the same time the space between lands 448 and 450 become exhausted through exhaust port 490. This upsets the force balance thereby tending to maintain the valve elements in a left-hand position.

If the valve element 486 is moved away from its cooperating control orifice 484, the pressure in the right-hand side of the valve land 460 will become exhausted while the pressure on the left-hand side of the land 448 is maintained. This will shift the valve elements in a right-hand direction until the space between the lands 458 and 460 become exhausted through exhaust port 470. This will cause a pressure force that maintains the valve elements in the right-hand position as the operator for the valve element 486 is de-energized.

For purposes of this description, the solenoid operators for valve elements 482, 486, 438 and 440 will be identified respectively as solenoid No. 1, solenoid No. 2, solenoid No. 3 and solenoid No. 4.

To condition the mechanism for reverse drive operation, solenoids 1 and 3 are energized. This will cause the valve element 402 to shift in a left-hand direction while the valve elements 446 and 456 are shifted in a left-hand direction, as explained above. Control pressure from passage 150 then will pass through the primary manual valve to the passage 416 and then to the passage 414. Passage 414 distributes control pressure to passage 194 through the secondary manual valve. It distributes control pressure also to passage 196 through the secondary manual valve.

When passages 194 and 196 are pressurized in this way, the control system is conditioned for reverse drive, as explained previously.

To condition the mechanism for neutral, solenoids Nos. 3 and 4 are applied and solenoids Nos. 1 and 2 are released. Both ends of the valve element 402 now become exhausted so that the springs form a manual valve and return the primary manual valve to the central position.

To condition the mechanism for automatic drive range operation or so-called range D operation, solenoids Nos. 1 and 4 are energized. This exhausts the right-hand side of valve element 402 and the left-hand side of the valve element 446. Throttle pressure acting in passage 246 is distributed to the right-hand side of the downshift blocker valve 400. This valve comprises valve elements 504 and 506. Valve element 504 has valve lands 508, 510 and 512 which are adapted to register with internal valve lands formed in valve chamber 514. Valve element 506 engages valve element 504. It may be situated in valve chamber 514 in the left-hand end thereof.

Presence of throttle pressure on the right-hand side of the valve element 504 will shift valve elements 504 and 506 in a left-hand direction, thereby establishing communication between passage 234 and passage 190 through the downshift blocker valve chamber 514. Exhaust port 516 is blocked at that time by land 512. Pressure passage 290 is exhausted through exhaust port 518 and the downshift blocker valve. Passage 196, however, becomes exhausted during the automatic drive range operation. This passage 196 communicates with the left-hand side of the downshift blocker valve land 506 through passage 520. Thus forced downshifts are made possible as passage 290' is brought into communication with passage 290.

To condition the mechanism for operation in the No. 1 drive range, solenoids Nos. 2 and 4 are energized and the others are released. Valve elements 446 and 450 will be shifted in a right-hand direction, as explained previously, thereby causing passage 196 to become pressurized and causing the downshift blocker valve to shift in a right-hand direction which prevents forced downshifts by the throtle downshift valve. Passage 192 continues to be pressurized since the position of the primary manual valve remains unchanged. Passage 192 receives its pressure from passage 150 through the primary manual valve chamber.

To condition the mechanism for second speed ratio or D2 operation, solenoids 1, 2 and 4 are energized. This causes the secondary manual valve to return to the neutral position shown in FIGURE 3 as the primary manual valve remains in the right-hand position. This will cause the pressure distribution to take place from passage 154 to passage 200 through the secondary manual valve. Passage 234 becomes pressurized by reason of the continued communication with passage 150 through the primary manual valve. Passage 196 becomes exhausted through the space between lands 450 and 452 and through exhaust passage 414 which continues to communicate with the exhaust port 418 in the primary manual valve.

The downshift blocker valve again prevents forced downshifts. This is done by distributing pressure in passage 200 to the left-hand side of land 508 through passage 522. This causes the downshift blocker valve to continue to exhaust passage 290 through exhaust port 518.

In FIGURE 6 I have shown an alternate pilot valve construction that may replace the pilot valve elements 482, 486, 438 and 440. It comprises a valve element 524 situated slidably in chamber 526. It has two valve lands 528 and 530, which register with internal valve lands in the chamber 526. Control pressure is distributed to the valve chamber 526 through port 532. An exhaust port 534 registers with land 528. Valve spring 536 urges the valve element 524 normally in a downward direction. The annular space between lands 530 and 528 communicates with passage 538 which in turn distributes pressure to one end or the other of the primary manual valve or the secondary manual valve.

Valve element 524 is connetced to an armature lever 548 which is pivoted intermediate its ends. The armature lever 548 can be moved from one position to another by solenoid windings 542.

When the windings are energized, valve element 524 exhausts passage 538 and when the windings are de-energized, the spring returns the valve element 524 to the position shown so that communication is established between the line pressure passage 532 and the control passage 538.

Having thus described a preferred form of my invention, what I claim and desire to secure by U.S. Letters Patent is:

1. In a multiple ratio power transmission mechanism having gear elements defining plural torque delivery paths between a driving member and a driven member, fluid pressure operated clutch and brake means for controlling the relative motion of said gear elements to initiate torque ratio changes, a control pressure source, conduit structure defining a fluid circuit connecting said source and said clutch and brake means, fluid pressure distributor valve means situated in and partly defining said conduit structure for controlling distribution of pressure selectively to said clutch and brake means for initiating automatic control responses, manual valve means situated between said pressure source and said distributor valve means for controlling pressure distribution to said distributor valve means and to said clutch and brake means, said manual valve means having at least two operating positions, said manual valve means distributing pressure to one circuit region when it assumes one position and to another circuit region when it assumes another position, said manual valve means comprising a movable valve element, a valve chamber containing said movable valve element, a pressure chamber situated at one side of said movable valve element, a control orifice communicating on one side thereof with said pressure chamber and on the other side thereof with a low pressure region of said circuit, a fluid connection between said control pressure source and said one side of said orifice, a pilot valve element movable into and out of registry with said control orifice, and a semi-antomatic pilot valve means for moving said pilot valve element thereby triggering control responses of said clutch and brake means as said movable valve element is shifted toward said pressure chamber, a pair of control pressure areas on said movable valve element in fluid communication with said pressure source, the control pressure acting on said control areas to produce opposed pressure forces on said movable valve element, an exhaust port in said valve chamber adjacent each control area, said movable valve element, upon shifting movement thereof toward said pressure chamber to an adjusted position, establishing communication between one exhaust port and one pressure area whereby said movable valve element maintains said adjusted position irrespective of the position of said pilot valve element.

2. In a multiple ratio power transmission mechanism having gear elements defining plural torque delivery paths between a diving member and a driven member, fluid pressure operated clutch and brake means for controlling the relative motion of said gear elements to initiate torque ratio changes, a control pressure source, conduit structure defining a fluid circuit connecting said source and said clutch and brake means, fluid pressure distributor valve means situated in and partly defining said conduit structure for controlling distribution of pressure selectively to said clutch and brake means for initiating automatic control responses, manual valve means situated between said pressure source and said distributor valve means for controlling pressure distribution to said distributor valve means and to said clutch and brake means, said manual valve means having at least two operating positions, said manual valve means distributing pressure to one circuit region when it assumes one position and to another circuit region when it assumes another position, said manual valve means comprising a movable valve element, a valve chamber containing said movable valve element, a pressure chamber situated at one side of said movable valve element, a control orifice communicating at one side thereof with said pressure chamber and on the other side thereof with a low pressure region of said circuit, a fluid connection between said control pressure source and said one side of said orifice, a pilot valve element movable into and out of registry with said control orifice, semi-automatic pilot valve means for moving said pilot valve element thereby triggering control responses of said manual valve means, a second pressure chamber situated at the other side of said movable manual valve element, a second control orifice communicating on one side thereof with said second pressure chamber and on the other side thereof with a low pressure region of said circuit , a fluid connection between said control pressure source and said one side of said orifice, a second pilot valve element registering with said second orifice, and second semi-automatic pilot valve means for moving said second pilot valve element a pair of control pressure areas formed on said movable valve element in fluid communication with said pressure source when said movable valve element assumes a first position intermediate adjusted positions, the control pressure acting on said areas to produce opposed pressure forces on said valve element, an exhaust port in said valve chamber adjacent each control area, said movable valve element, upon shifting movement toward either of said pressure chamber to one of said adjusted positions, establishing communication between one control area and one of said exhaust ports whereby said movable valve element maintains its adjusted position irrespective of the position of the pilot valve element associated with said one pressure chamber.

3. The combination as set forth in claim 1 wherein said pilot valve element comprises a movable valve member having one part thereof in registry with its associated control orifice and another part thereof extending in the direction of the axis of said orifice, an electrical solenoid operator having electrical windings and a movable armature, said movable armature being connected mechanically to said pilot valve element, and spring means for normally urging said pilot valve element into registry with its associated control orifice.

4. The combination as set forth in claim 2 wherein each pilot valve element comprises a movable valve member having one part thereof in registry with its associated control orifice and another part thereof extending in the direction of the axis of its orifice, an electrical solenoid operator having electrical windings and a movable armature, said movable armature being connected mechanically to each pilot valve element, and spring means for normally urging each pilot valve element into registry with its associated control orifice.

5. The combination as set forth in claim 1 wherein said pilot valve element comprises a movable pilot valve spool and a pilot valve chamber containing said spool, an exhaust port and a pressure supply passage communicating with said pilot valve chamber, the pressure chamber for said manual valve being in fluid communication with said pilot valve chamber, spring means for normally biasing said pilot valve spool to an exhaust port blocking position whereby communication is established between said control pressure source and said pilot valve chamber, solenoid windings, a movable solenoid armature, one end of said armature being connected to said pilot valve spool and the other armature end being adapted to register with said windings as the latter are energized thereby moving said pilot valve spool to a position that establishes communication between said exhaust port and said pressure chamber.

6. The combination as set forth in claim 2 wherein each pilot valve element comprises a movable pilot valve spool and a pilot valve chamber containing said spool, an exhaust port and a pressure supply passage communicating with said pilot valve chamber, the pressure chamber for said manual valve being in fluid communication with said pilot valve spool to an exhaust port blocking position whereby communication is established between said control pressure source and said pilot valve chamber, solenoid windings, a movable solenoid armature, one end of said armature being connected to said valve spool and the other armature end being adapted to register with said windings as the latter are energized thereby moving said pilot valve spool to a position that establishes communication between said exhaust port and said pressure chamber.

References Cited
UNITED STATES PATENTS

| | | | |
|---|---|---|---|
| 2,251,625 | 8/1941 | Hale | 74—752 |
| 2,363,111 | 11/1944 | Bennett | 137—625.64 |
| 2,584,965 | 2/1952 | McFarland | 74—752 X |
| 2,608,880 | 9/1952 | Flinn | 74—752 X |
| 2,693,711 | 11/1954 | Kelbel et al. | 74—752 X |
| 2,982,306 | 5/1961 | Fitzgibbon | 137—625.64 |
| 2,993,511 | 7/1961 | Johnson | 137—625.64 |
| 3,159,051 | 12/1964 | Herndon et al. | 74—869 X |
| 3,324,738 | 6/1967 | Olsen et al. | 74—868 X |
| 3,398,007 | 8/1968 | Chana | 74—868 X |

DONLEY J. STOCKING, Primary Examiner

T. C. PERRY, Assistant Examiner

U.S. Cl. X.R.

74—869; 137—625.64